(12) United States Patent
Yang et al.

(10) Patent No.: US 11,436,571 B2
(45) Date of Patent: Sep. 6, 2022

(54) AUTOMATIC CLASSIFICATION SYSTEM

(71) Applicant: JIANGXI UNIVERSITY OF SCIENCE AND TECHNOLOGY, Ganzhou (CN)

(72) Inventors: Jie Yang, Ganzhou (CN); Zhuang Kang, Ganzhou (CN); Limin Jia, Ganzhou (CN); Jiajun Li, Ganzhou (CN); Guilan Li, Ganzhou (CN); Lang He, Ganzhou (CN); Zhichao Chen, Ganzhou (CN)

(73) Assignee: JIANGXI UNIVERSITY OF SCIENCE AND TECHNOLOGY, Ganzhou (CN)

( * ) Notice: Subject to any disclaimer, the term of this patent is extended or adjusted under 35 U.S.C. 154(b) by 434 days.

(21) Appl. No.: 16/626,688

(22) PCT Filed: Jul. 15, 2019

(86) PCT No.: PCT/CN2019/096015
§ 371 (c)(1),
(2) Date: Dec. 26, 2019

(87) PCT Pub. No.: WO2020/206862
PCT Pub. Date: Oct. 15, 2020

(65) Prior Publication Data
US 2021/0357879 A1    Nov. 18, 2021

(30) Foreign Application Priority Data

Apr. 8, 2019  (CN) .......................... 201910276837.1

(51) Int. Cl.
*B07C 5/34*      (2006.01)
*G06Q 10/00*   (2012.01)
(Continued)

(52) U.S. Cl.
CPC ............... *G06Q 10/30* (2013.01); *B07C 5/34* (2013.01); *B07C 5/362* (2013.01); *B65F 1/004* (2013.01);
(Continued)

(58) Field of Classification Search
CPC  B07C 5/122; B07C 5/34; B07C 5/362; B07C 5/38; B07C 2501/0054;
(Continued)

(56) References Cited

U.S. PATENT DOCUMENTS 5,048,903 A * 9/1991 Loblein ................. B65F 1/0033
                                                                    312/234.1
5,129,318 A * 7/1992 Zimmer ................ B30B 9/3075
                                                                    100/269.06
(Continued)

FOREIGN PATENT DOCUMENTS

CN        205837716 U       12/2016
CN        106516487 A        3/2017
(Continued)

OTHER PUBLICATIONS

Redmon et al., "YOLOv3: An Incremental Improvement", p. 1-6, Apr. 2018, University of Washington, https://arxiv.org/abs/1490.1556v6.

*Primary Examiner* — Joseph C Rodriguez
(74) *Attorney, Agent, or Firm* — WPAT, PC

(57) ABSTRACT

Provided is an automatic classification system. The automatic classification system is designed based on a YOLOV3 technical framework, so that garbage can be classified and recycled, garbage pollution is reduced, and waste is recycled at the maximum cost. The system is designed with a box of a double-layer structure, wherein an upper box is provided with a garbage throwing-in opening, a camera is mounted at the upper box, and the upper top of the upper box is provided
(Continued)

with an partition layer for the installation of a solar panel and a storage battery, so as to meet the power supply requirement of the system. The camera captures thrown-in garbage and uses the recognition algorithm to recognize and classify the garbage classes. A lower box is designed into a double-box structure or a multi-box structure according to the class of the garbage, a mechanical and electric control part is arranged at the joint of the upper box and the lower box, two steering engines are used for respectively controlling the rotation of control baffles and a classification baffle so as to automatically drive the garbage to fall into classification boxes corresponding to the class of the garbage. The automatic classification of the garbage can be realized by the disclosure.

6 Claims, 5 Drawing Sheets

(51) Int. Cl.
  *B65F 1/00*  (2006.01)
  *G06K 9/62*  (2022.01)
  *B07C 5/36*  (2006.01)
(52) U.S. Cl.
  CPC .......... *B65F 1/0033* (2013.01); *G06K 9/6267* (2013.01); *B65F 2210/172* (2013.01); *B65F 2210/176* (2013.01); *Y02W 30/10* (2015.05)
(58) Field of Classification Search
  CPC .. B65F 1/0033; B65F 1/004; B65F 2001/008; B65F 2210/152; B65F 2210/1522; B65F 2210/1525; B65F 2210/1527; B65F 2210/172; B65F 2210/176; G06K 9/6267; G06Q 10/30

See application file for complete search history.

(56) References Cited

U.S. PATENT DOCUMENTS

| | | | | |
|---|---|---|---|---|
| 5,139,205 | A * | 8/1992 | Gallagher | ........... B02C 18/0007 241/101.2 |
| 5,259,304 | A * | 11/1993 | Roberts | ................. B30B 9/3064 100/223 |
| 5,447,017 | A * | 9/1995 | Becher | .................. B65F 1/0033 53/527 |
| 8,555,781 | B1 * | 10/2013 | Garcia | .................. B65F 1/1405 100/98 R |
| 10,406,564 | B1 * | 9/2019 | Al-Ateeq | ................. B07C 5/362 |
| 2006/0091247 | A1 | 5/2006 | Matlin | |

FOREIGN PATENT DOCUMENTS

| | | |
|---|---|---|
| CN | 107499775 A | 12/2017 |
| CN | 207329411 U | 5/2018 |
| CN | 108792362 A | 11/2018 |
| CN | 208165794 U | 11/2018 |
| CN | 109389161 A | 2/2019 |
| CN | 109573383 A | 4/2019 |
| CN | 109928107 A | 6/2019 |
| GB | 2498701 A | 7/2013 |

* cited by examiner

AUTOMATIC CLASSIFICATION SYSTEM

TECHNICAL FIELD

The disclosure relates to a garbage classification technology, in particular to a circuit system for automatically classifying garbage.

BACKGROUND

In contemporary society, energy conservation and emission reduction are the topics that people pay close attention to, and are one of the most prominent problems in society currently, especially in the aspect of garbage classification and recycling. Although most people use classification garbage cans in their lives, according to investigation and life experience, most users throw garbage at will and will not throw it into the corresponding garbage cans based on the class of garbage. In existing classification garbage cans, all kinds of garbage is still mixed and indistinguishable. This will make it impossible to classify and recycle the garbage, leading to the waste of resources. If classification is done manually, a lot of manpower and financial resources will be wasted.

Therefore, a garbage classification system with a simple structure and a fast and efficient classification process is needed to solve the above problems.

SUMMARY

Against the deficiencies in the prior art, the present disclosure provides an automatic classification system based on artificial intelligence to automatically recognize and classify garbage thrown into a garbage can. The disclosure specifically adopts the following technical solution.

In order to achieve the above object, the disclosure provides an automatic classification system, including a camera, an LED light, a storage battery, a solar panel, a control panel and an automatic classification garbage can; the automatic classification garbage can includes a first steering engine, a second steering engine and control baffles; the control baffles are correspondingly connected with horizontal central shaft columns and divides the interior of a barrel into an upper box and a lower box; the camera, the LED light, the storage battery, the solar panel and the control panel are all contained on an upper top of the upper box; an output end of the solar panel is connected with the storage battery, the storage battery supplies power for the camera, the LED light, the control panel, the first steering engine and the second steering engine; and the control panel includes: a picture receiving unit connected with the camera and used for acquiring a picture acquired by the camera; a picture processing unit for processing the picture and recognizing the classes of objects in the picture; and a steering engine control unit which is connected with the first steering engine and the second steering engine, and used for driving the second steering engine according to the classes of the objects recognized by the picture processing unit to drive a classification baffle through a vertical central shaft column to move the objects contained in the upper box onto the control baffles corresponding to the classes of the objects, and then driving the first steering engine to drive the control baffles to turn over through the horizontal central shaft columns, so that the objects fall into classification boxes corresponding to the classes of the objects under the control baffles.

Optionally, the first steering engine and the second steering engine are MG995 steering engines.

Optionally, the automatic classification garbage can further includes: a barrel, wherein at least one garbage throwing-in opening is formed in an upper part of a side wall of the barrel; the first steering engine is fixed outside the side wall of the barrel and connected with the horizontal central shaft columns; the horizontal central shaft columns penetrate through the interior of the barrel in the diameter direction of the barrel, and are driven to rotate by the first steering engine; the second steering engine is arranged at an upper top of the upper box, and connected with the vertical central shaft column; the vertical central shaft column penetrates through the interior of the upper box in the axial direction of the barrel, and is driven to rotate by the second steering engine; and the control baffles can turn over around the horizontal central shaft columns with the rotation of the horizontal central shaft columns to open or close a bottom of the upper box, so that the objects contained in the upper box fall into the lower box.

Optionally, the automatic classification garbage can further includes: a classification baffle, wherein a middle part of the classification baffle is connected with a lower end of the vertical central shaft column to divide the upper box into two parts; and the classification baffle can rotate around the vertical central shaft column with the rotation of the vertical central shaft column to drive the objects contained in the upper box to move onto the control baffles corresponding to the classes of the objects.

Optionally, the lower box is divided into a plurality of classification boxes by taking the horizontal central shaft columns as a boundary, wherein each control baffle is corresponding to one classification box; an upper part of each classification box is closed by one control baffle; and the control panel acquires the picture collected by the camera, recognizes the classes of objects in the picture, and drives the second steering engine according to the classes of the objects to drive the classification baffle through the vertical central shaft column to move the objects contained in the upper box onto the control baffles corresponding to the classes of the objects, and then drives the first steering engine to drive the control baffles to turn over through the horizontal central shaft columns, so that the objects fall into the classification boxes corresponding to the classes of the objects under the control baffles.

Optionally, the automatic classification garbage can further includes a first gear and a second gear; the first steering engine is fixedly connected with the first gear, and the first gear is engaged with the second gear to transfer driving force output by the first steering engine to the second gear; the number of the horizontal central shaft columns is two; each is connected with one control baffle; and the two horizontal central shaft columns are correspondingly connected with the first gear and the second gear, and driven by the first gear and the second gear correspondingly to drive the control baffles connected with the horizontal central shaft columns to turn over to open or close the bottom of the upper box, so that the objects contained in the upper box fall into the classification boxes corresponding to the object classes in the lower box.

Beneficial Effects

According to the disclosure, the automatic classification garbage can device is designed based on the YOLOV3 technical framework, so that garbage is classified and recycled, garbage pollution is reduced, and waste is recycled at the maximum cost. The disclosure is designed with a garbage can of a double-layer structure, wherein an upper box is provided with a garbage throwing-in opening, a camera is mounted at the upper box, and a partition layer is arranged at the upper top of the upper box for the installation of a solar panel and a storage battery, so as to meet the power supply requirement of the system. The camera captures thrown-in garbage and uses the recognition algorithm to recognize and classify the garbage classes. The lower box is designed into a double-box structure or a multi-box structure according to the class of the garbage, a mechanical and electric control part is made at the joint of the upper box and the lower box, the two steering engines are used for respectively controlling the rotation of the control baffles and the classification baffle so as to automatically drive the garbage to fall into the classification boxes corresponding to the class of the garbage. The automatic classification of the garbage can be realized by the disclosure.

Additional features and advantages of the disclosure will be set forth in the description below, and in part will be apparent from the description, or may be learned by the practice of the disclosure.

BRIEF DESCRIPTION OF THE DRAWINGS

The drawings are used for further understanding of the disclosure, and form a part of the description. The drawings and the embodiments of the disclosure together are used to explain the disclosure, but not limit thereto. In the drawings.

REFERENCE NUMERALS

Figure 1:
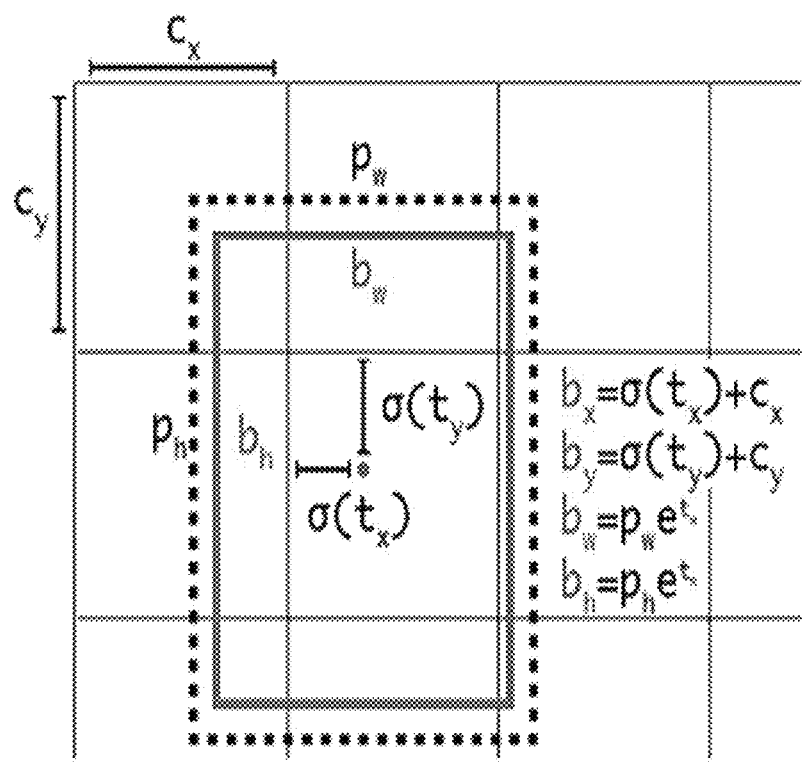
FIG. 1 is a geometric relationship diagram of Anchor prediction frame positions used in a YOLOV3 object recognition method adopted by the present disclosure.

| | |
|---|---|
| 1. barrel | 2. first steering engine |
| 3. horizontal central shaft column | 4. control baffle |
| 5. second steering engine | 6. vertical central shaft column |
| 7. classification baffle | 8. garbage throwing-in opening |
| 11. first classification box | 12. second classification box |
| 21. first gear | 22. second gear |

DETAILED DESCRIPTION

In order to make the objective and technical solutions of the embodiment of the present disclosure clearer, the technical solutions of the embodiment of the present disclosure will be described clearly and completely below in conjunction with the drawings of the embodiment of the present disclosure. Apparently, the embodiments described are some embodiments of the disclosure, but not all embodiments. All of the other embodiments, obtained by those of ordinary skill in the art based on the embodiments of the present disclosure without any inventive efforts, fall into the protection scope of the present disclosure.

Those skilled in the art will understand that unless otherwise defined, all terms (including technical terms and scientific terms) used herein have the same meaning as commonly understood by those of ordinary skill in the art to which the present disclosure belongs. It should also be understood that terms such as those defined in general dictionaries should be understood to have meanings consistent with those in the context of the prior art, and will not be interpreted in idealized or overly formal meanings unless defined as herein.

The meanings of "inside and outside" in the present disclosure are relative to a barrel itself, the direction pointing to a box in the barrel is inside, otherwise it is outside, which are not specific limitations to a device mechanism of the present disclosure.

The meaning of "connection" in the present disclosure may be direct connection between components or indirect connection between components through other components.

The meanings of "upper and lower" in the present disclosure refer to that when a user is facing an automatic classification garbage can, the direction pointing to a classification box from a steering engine is "lower", otherwise it is "upper", which are not specific limitations to the device mechanism of the present disclosure.

An algorithm identification part of the disclosure firstly collects pictures of common recyclable and non-recyclable garbage, makes a data sample library, labels and marks the data sample library, and trains the data sample library. In a subsequent application process, the garbage is recognized and classified by a picture processing algorithm and training results above. A yolov3 algorithm is proposed to be used for a recognition algorithm here, but it is not limited thereto.

The disclosure mainly develops the automatic intelligent classification garbage can device based on the YOLOV3 object recognition algorithm to help people solve the problem of garbage classification, in which the difficulty lies in the class detection of garbage. Current mainstream target detection algorithms mainly include Faster R-CNN, YOLO, SSD and the like. YOLO has good effects on recognition accuracy and the recognition speed, therefore, the disclosure adopts a YOLO network model to design an automatic classification device for recyclable garbage and non-recyclable garbage. The YOLO series algorithms have respective advantages and disadvantages from v1 to v3. YOLO which adopts an end-to-end idea in a detection mode trains by using a Darknet network, and the model takes the whole picture as an input of the network, and the YOLO series algorithm uses a regression method to directly return a position of a bounding box and the class to which the bounding box belongs at an output layer, which is different from the traditional recognition algorithm. For example, RCNN adopts the idea of proposal plus classifier, but the step of extracting a proposal is implemented on CNN, while YOLO adopts the idea of direct regression.

Figure 4:
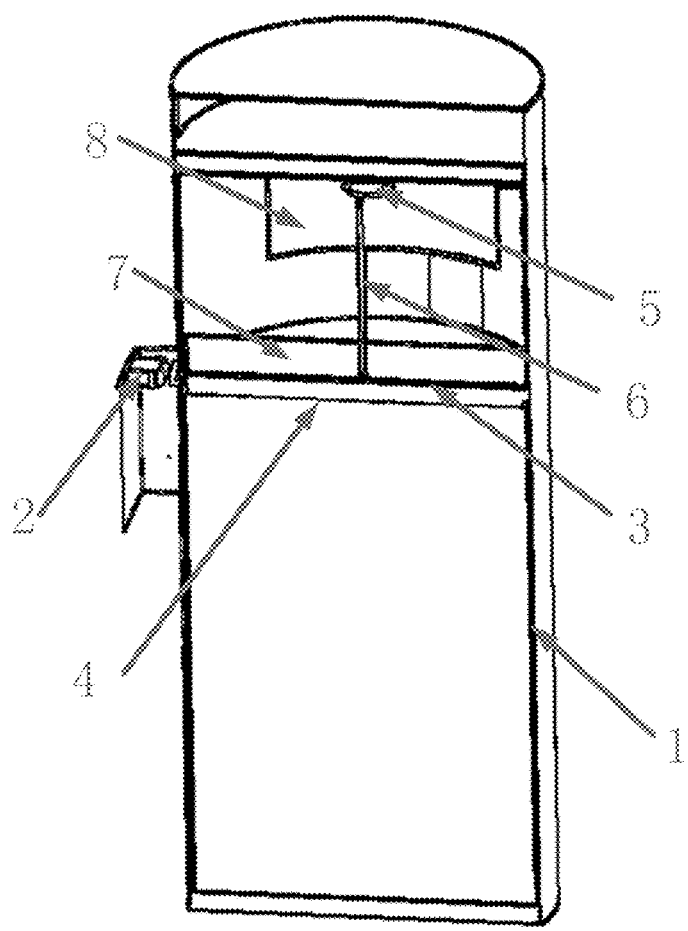
FIG. 4 is a cross-sectional view of an automatic classification garbage can based on the artificial intelligence according to the present disclosure.

Specifically, referring to FIG. 4, an automatic classification garbage can provided by the present disclosure uses the above-mentioned method to recognize the class of garbage so as to classify the garbage. The whole automatic classification garbage can is divided into a box structure, a mechanical transmission part and a photovoltaic energy supply part.

Figure 5:
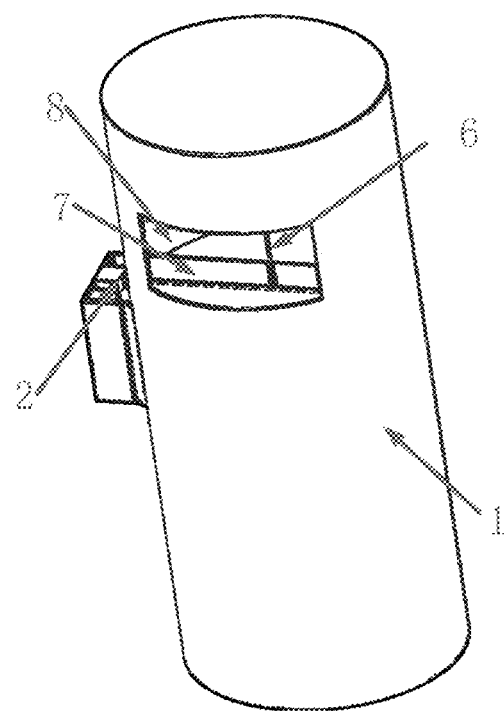
FIG. 5 is an overall structural diagram of the automatic classification garbage can based on the artificial intelligence according to the present disclosure.

A barrel 1, wherein at least one throwing-in opening or two opposite garbage throwing-in openings 8 are formed in an upper part of a side wall of the barrel 1; the barrel 1 is arranged to be a two-box structure in a cylindrical shape integrally, and the whole barrel is separated by control baffles and divided into an upper layer and a lower layer (an upper box and a lower box); the garbage throwing-in openings 8 are located 10 cm away from the control baffles; and the upper box includes a garbage classification device and a power supply CPU control part. The garbage classification device consists of a classification baffle and the control baffles. The structural schematic diagram of the garbage classification device is shown in FIG. 5. The control baffles 4 are arranged, wherein the number of the control baffles 4 is at least two; the control baffles 4 are correspondingly arranged below the two garbage throwing-in openings 8 and correspondingly connected with horizontal central shaft columns 3 to divide the interior of the barrel 1 into an upper box and a lower box; and the control baffles 4 can turn over around the horizontal central shaft columns 3 with the rotation of the horizontal central shaft columns 3 to open or close a bottom of the upper box, so that the objects contained in the upper box fall into the lower box. Specifically, the two semicircular control baffles controlled by the horizontal central shaft columns fixedly controlled by gears are horizontally placed and controlled by a first steering engine 2.

The lower box is of a two-box structure. The lower box is separated from the center by a vertically placed central partition board, and the placing direction of the central partition board is parallel to those of the horizontal central shaft columns. A semicircular garbage collecting bin is arranged between the two boxes for collecting classified garbage.

The first steering engine 2 described above is fixed to the outside of the side wall of the barrel 1, and is connected with the horizontal central shaft columns 3, and the horizontal central shaft columns 3 penetrate through the interior of the barrel 1 in the diameter direction of the barrel 1, and are driven to rotate by the first steering engine 2.

The second steering engine 5 described above is arranged at an upper top of the upper box and connected with a vertical central shaft column 6 which penetrates through the interior of the upper box in the axial direction of the barrel 1; the vertical central shaft column 6 is driven to rotate by the second steering engine 5; and the first steering engine 2 and the second steering engine 5 can be MG995 steering engines.

Figure 7:
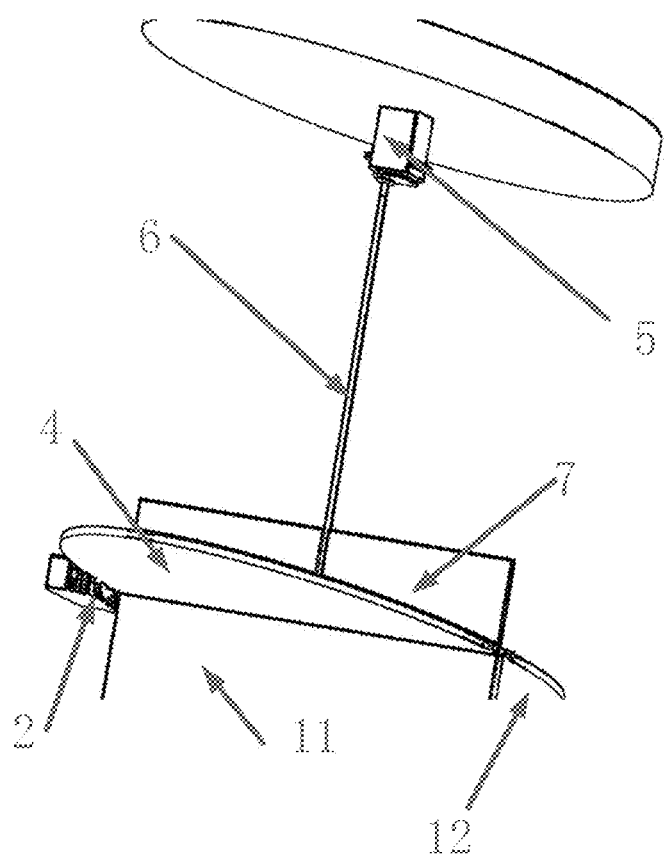
FIG. 7 is a schematic diagram of a driving mode of a second steering engine in the automatic classification garbage can based on the artificial intelligence according to the present disclosure.

A classification baffle 7, referring to FIG. 7, wherein a middle part of the classification baffle 7 is connected with a lower end of the vertical central shaft column 6 to divide the upper box into two parts; the classification baffle 7 can rotate around the vertical central shaft column 6 with the rotation of the vertical central shaft column 6 to drive the objects contained in the upper box to move onto the control baffles 4 corresponding to the classes of the objects; that is to say, the classification baffle is controlled by the second steering engine 5 and vertically placed above the control baffles with the placing direction parallel to those of the horizontal central shaft columns, the vertical central shaft column arranged at the center of the classification baffle is fixed to a rotating shaft of the steering engine 2, and the classification baffle is controlled to turn to classify garbage by controlling the turning of the steering engine.

The lower box is divided into a plurality of classification boxes by taking the horizontal central shaft columns 3 as a boundary, each control baffle 4 corresponds to one classification box, and an upper part of each classification box is closed by one control baffle 4.

A camera is arranged at an upper top of the upper box and is used for acquiring a picture of objects contained in the upper box.

Figure 8:
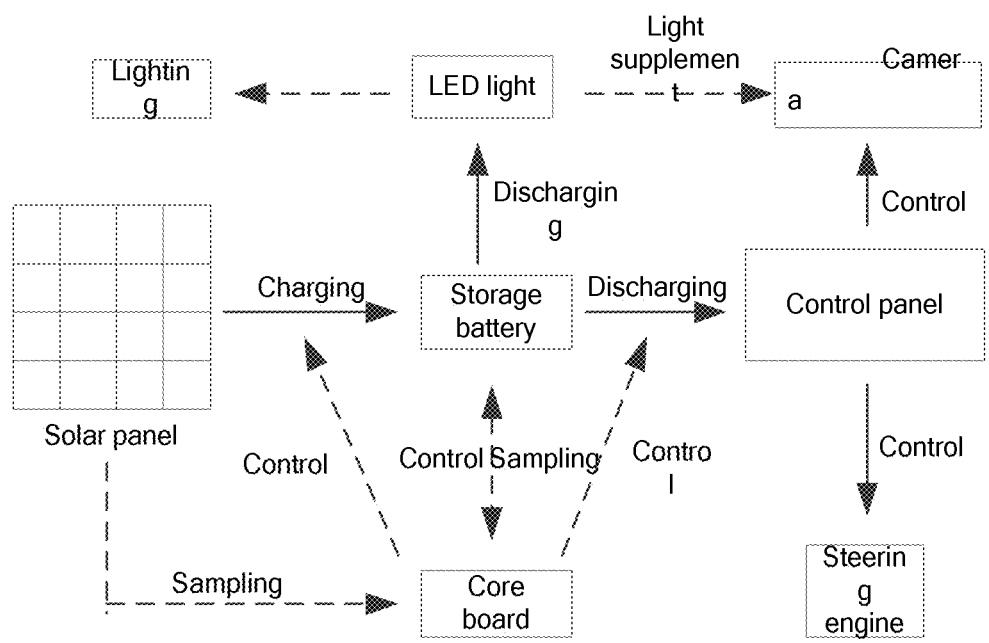
FIG. 8 is a block diagram of a circuit system in the automatic classification garbage can based on the artificial intelligence according to the present disclosure.

Referring to FIG. 8, due to the diversity of application sites and environments for garbage cans, an outdoor garbage can circuit part can also be provided with an LED light, a storage battery, a solar panel and a control panel on the upper top of the upper box. The top of the garbage can and the partition board mounted on the steering engine 2 are used for mounting the solar panel as a photovoltaic power source, and the partition board is also used for mounting a control board part. An output end of the solar panel is connected with the storage battery, and the storage battery supplies power for the camera, the LED light, the control panel, the first steering engine 2 and the second steering engine 5, thus, the disclosure supplies self-energy to the system by employing the solar panel to receive solar radiation energy during the day and to convert the solar radiation energy into electric energy to be stored in the storage battery through a controller, realizes self-sufficiency of energy, and can still operate without being connected with an external power supply.

The control panel includes: a picture receiving unit connected with the camera and used for acquiring a picture acquired by the camera; a picture processing unit for processing the picture and recognizing the classes of objects in the picture; and a steering engine control unit which is connected with the first steering engine 2 and the second steering engine 5, and used for driving the second steering engine 5 according to the classes of the objects recognized by the picture processing unit to drive a classification baffle 7 through a vertical central shaft column 6 to move the objects contained in the upper box onto the control baffles 4 corresponding to the classes of the objects, and then driving the first steering engine 2 to drive the control baffles 4 to turn over through the horizontal central shaft columns 3, so that the objects fall into classification boxes corresponding to the classes of the objects under the control baffles 4.

Figure 6:
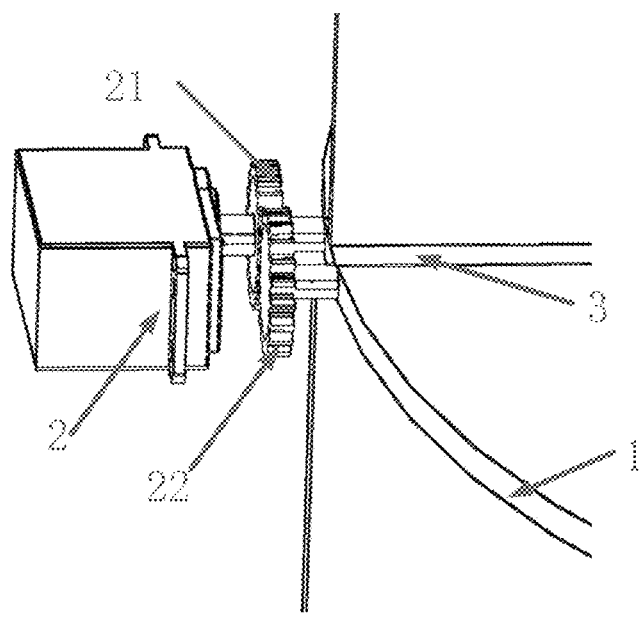
FIG. 6 is a schematic diagram of a driving mode of a first steering engine in the automatic classification garbage can based on the artificial intelligence according to the present disclosure.

Referring to FIG. 6, in a preferred embodiment, the number of the horizontal central shaft columns 3 is two, the horizontal central shaft columns 3 respectively control the two control baffles, and are driven by a first gear 21 and a second gear 22 correspondingly, wherein:
the first steering engine 2 is fixedly connected with the first gear 21, and the first gear 21 is engaged with the second gear 22 to transfer driving force output by the first steering engine 2 to the second gear 22;
the number of the horizontal central shaft columns 3 is two, and each horizontal central shaft column 3 is connected with one control baffle 4; and the two horizontal central shaft columns 3 are correspondingly connected with the first gear 21 and the second gear 22, and driven by the first gear 21 and the second gear 22 to drive the control baffles 4 connected with the horizontal central shaft columns 3 to turn over to open or close the bottom of the upper box, so that the objects contained in the upper box fall into the classification boxes corresponding to the classes of the objects in the lower box.

Figure 2:
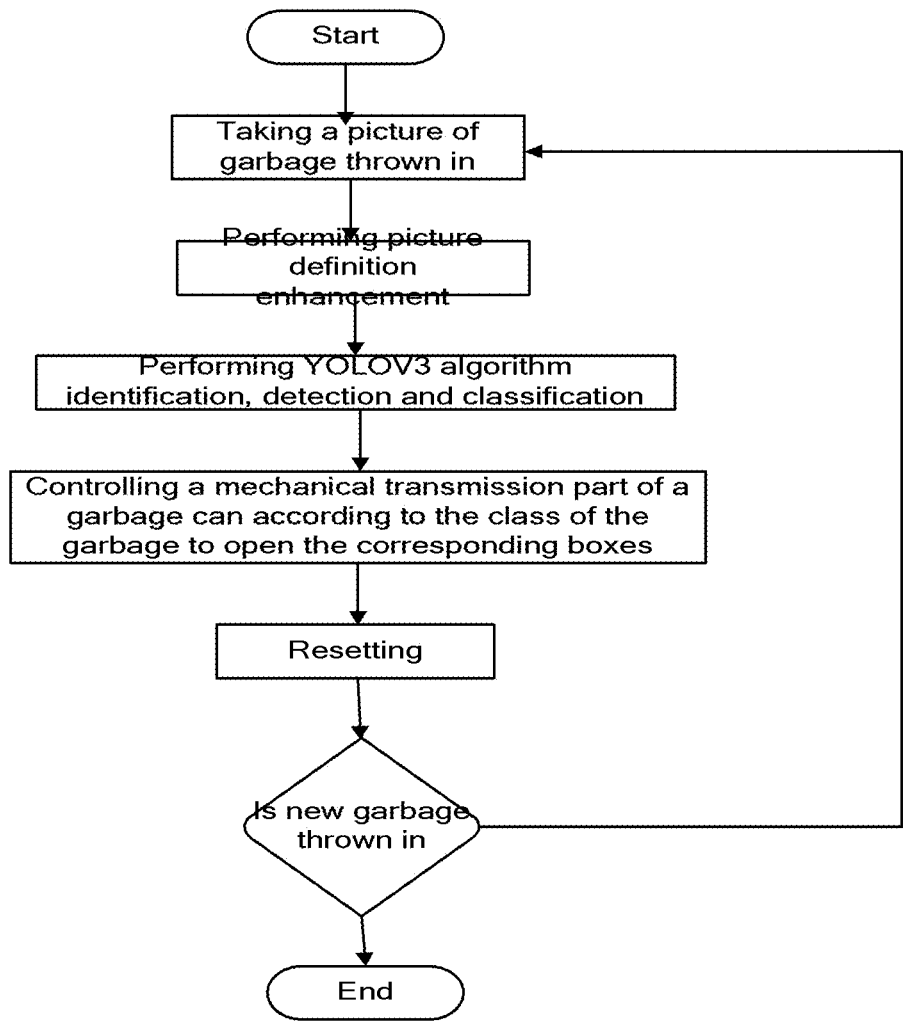
FIG. 2 is a flow chart of an automatic garbage classification method based on artificial intelligence according to the present disclosure.

The mechanical transmission is controlled by the steering engines which are micro servo systems. The working principle of the steering engine is that a control circuit receives a control pulse of a signal source and drives a motor to rotate; a gear set reduces the speed of the motor by a large multiple, amplifies the output torque of the motor by a response multiple, and then outputs; a potentiometer and the last stage of the gear set rotate together to measure a rotation angle of a steering engine shaft; and a circuit board detects and judges the rotation angle of the steering engine according to the potentiometer, and then controls the steering engine to rotate to reach or be kept at a target angle. The steering engine control has good effect on control precision and speed. Adopted is the MG995 steering engine which has good stability and higher control precision, and can stably and accurately control the turning and classification of the classification baffle and the opening and closing of the control baffles. The control baffles are controlled by the first steering engine 2, and two gears are used to engage the central shaft columns of the two control baffles to achieve the effect of synchronous control. As the schematic diagram shown in FIG. 6. the second steering engine 5 controls the classification baffle and is responsible for correctly classifying the garbage. The steering engine shaft and a central shaft column of the classification baffle are fixed together, and the operation of the classification baffle is controlled by controlling the rotation of the steering engine. The steps for classifying the garbage by the control panel of the garbage can be specifically shown in FIG. 2, including:

step one, when an object enters the upper box, acquiring a picture of the object through the camera;

step two, carrying out defogging and definition enhancement processing on the picture, and adjusting the size of the picture to an integer multiple of 32;

step three, performing circular convolution neural network training on the processed picture through a YOLO v3 method to recognize the class of the object in the processed picture, wherein the step three specifically includes the following steps:

step 301, performing grid partition on the picture obtained in the step two;

step 302, obtaining a priori anchor corresponding to a grid above by using a k-means or IOU method;

step 303, training with a Darknet network, performing regression calculation by taking the whole picture obtained in step two as an input of the network to obtain the position of the bounding box and the class to which the bounding box belongs through regression calculation at an output layer of the Darknet network, and calculating an accuracy rate of the bounding box; and step 304, filtering the position, the class and the accuracy rate of the obtained bounding box by using NMS to filter out the bounding box of which the accuracy rate is lower than a set threshold, and outputting a class recognition result according to the position and the class of the bounding box corresponding to a remaining bounding box; and step four, driving the second steering engine 5 according to the object classes recognized in step three to drive the classification baffle 7 through the vertical central shaft column 6 to move the objects contained in the upper box onto the control baffles 4 corresponding to the classes of the objects, and then driving the first steering engine 2 to drive the control baffles 4 to turn over through the horizontal central shaft columns 3 so that the objects fall into the classification boxes corresponding to the object classes under the control baffles 4.

The garbage can mainly uses a picture target detection frame to recognize and detect the class of garbage in the garbage can, the camera is installed at the inlet of the garbage can, and is touched to take a picture when an object is thrown into the garbage can, and a detection algorithm is used to detect the taken picture. As the application object is the garbage can, the operation rapidity of the garbage can is of great importance, and timely response is required. The disclosure ensures the real-time performance of the algorithm, and the implementation process of the disclosure is further described as follows:

1. When garbage is detected to be thrown in, the camera is touched to take a picture, and the picture is subjected to defogging and definition enhancement processing so as to obtain a picture with better quality, thereby enabling a later training network to obtain better picture characteristics and increasing the accuracy of a result. The picture enhancement network here can use a GAN network, but is not limited thereto.

2. The present disclosure is an automatic classification garbage can based on artificial intelligence, and adopts two methods of taking photos and searching on the Internet to collect a total of 2,667 pictures of common recyclable garbage (plastic bottles, cloth, books and iron wires) and non-recyclable garbage (peel, broken glass, leftovers and napkins), which form a data sample library of the present disclosure, and a data set is labeled to make a training result more accurate.

3. After the data set is prepared, the circular convolution neural network is used for training, and some training parameters are set as follows: decay=0.005, learning_rate=0.001, steps=500000. The training is performed on GPU. In the step 2, the picture size needs to be processed as a multiple of 32 because YOLO v3 has 5 times of downsampling with a sampling step of 2 each, so the maximum stride of the network (stride refers to a result of the input size of the layer divided by the output) is 2^5=32. In the implementation, the most important thing is how to design a loss function. In the algorithm of the disclosure, a sum-squared error loss is used to design the loss function, and the final loss function is as follows:

$$\lambda_{coord}\sum_{i=0}^{s^2}\sum_{j=0}^{B}1_{ij}^{obj}(x_i-\hat{x}_i)^2+$$

$$(y_i-\hat{y}_i)^2+\lambda_{coord}\sum_{i=0}^{s^2}\sum_{j=0}^{B}1_{ij}^{obj}\left(\sqrt{\omega}_i-\sqrt{\hat{\omega}}_i\right)^2+$$

$$\left(\sqrt{h}_i-\sqrt{\hat{h}}_i\right)^2+\sum_{i=0}^{s^2}\sum_{j=0}^{B}1_{ij}^{obj}(C_i-\hat{C}_i)^2+$$

$$\lambda_{noobj}\sum_{i=0}^{s^2}\sum_{j=0}^{B}1_{ij}^{obj}(C_i-\hat{C}_i)^2+\sum_{i=0}^{s^2}1_i^{obj}\sum_{c\in classes}(p_i(c)-\hat{p}_i(c))^2$$

this loss function is mainly divided into four parts: coordinate prediction, object-containing feature value (confidence) prediction, object-free feature value (confidence) prediction and class prediction. The loss function is used to constrain the training network.

4. In order to use the YOLOV3 algorithm for detection, a priori anchor needs to be obtained. Specifically, a new anchor can be obtained on the collected data set by using k-means and IOU, but not limited to these two methods. An Anchor mechanism refers to that some reference frame shapes and sizes are set for each grid and during detection, only the reference frame needs to be refined instead of position regression of the whole picture.

In order to use the Anchor mechanism, the width and high dimensions of the reference frame need to be determined first. Although a network training process will also adjust the width and high dimensions of the frame and an accurate frame is obtained finally, if a more representative reference frame is selected from the beginning, the network can more easily detect the accurate position. The convolution neural network predicts 4 values for each bounding box in each cell, i.e. coordinates (x, y) and width w and height h of a target, which are denoted as xt, yt, wt and ht respectively. If the center of the target has an offset (xc, yc) in the cell relative to an upper left corner of the picture and an anchor frame has a width wp and a height hp, the modified bounding box is shown in FIG. 1. Wherein, $$b_x = \sigma(t_x) + c_x$$

$$b_y = \sigma(t_y) + c_y$$

$$b_w = p_w e^{t_w}$$

$$b_h = p_h e^{t_h}$$

5. The YOLOv3 algorithm is used to recognize the extracted picture and label the classes and positions of the objects. The specific processes are as follows:

A NMS (non-maximum suppression method) is used for filtering, after convolution network training, during testing, class information predicted by each grid is multiplied by confidence information predicted by the bounding box to obtain the class information and the class-specific confidence score for each bounding box:

$$Pr(Class_i|Object) * Pr(Object) * IOU_{pred}^{truth} = Pr(Class_i|Object) * IOU_{pred}^{truth}$$

a first term on the left of the equation is the class information predicted by each grid, and a second term and a third term are the confidence predicted by each bounding box. After the class information and the class-specific confidence score of each box are obtained, a threshold is set, the boxes with low scores are filtered out, and the remaining boxes are subjected to NMS processing to obtain a final detection result.

Therefore, the disclosure skillfully uses the principle of multi-scale detection of the YOLOv3 algorithm, and has high detection accuracy of garbage. Especially when the garbage is small, yolov3 has very good accuracy for recognizing small objects, so that no missed garbage detection or less detection appears. At the same time, recall is increased without changing mAP by using an anchor box method, and the calculation is reduced by 33% by using a new network structure. The speed is higher than those of other detection systems (FasterR-CNN, ResNet and SSD), the recall rate and accuracy are improved, the positioning accuracy is increased, and the classification accuracy is maintained. With the deepening of the network and the combination of multiple models, the training accuracy can be improved, and at the same time, the picture can be subjected to data enhancement, so that extracted features are more significant and the picture quality is higher. The recognition result is shown in FIG. 3.

Figure 3:
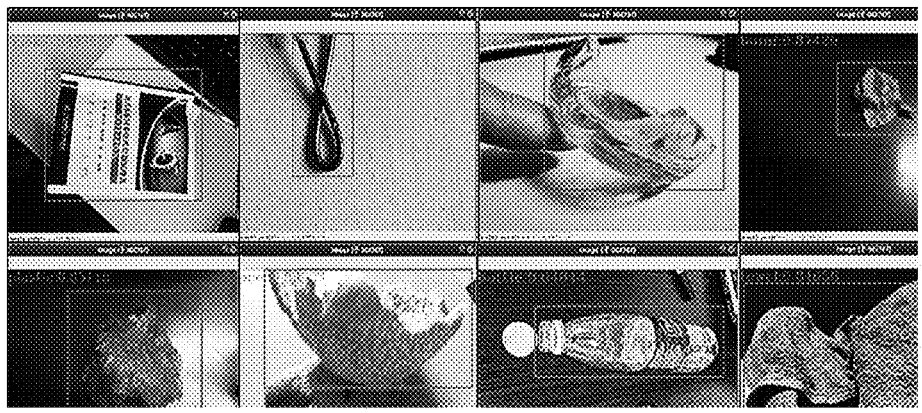
FIG. 3 is a diagram of a recognition result of a test performed by the YOLOV3 object recognition method according to the present disclosure.

Therefore, according to the disclosure, after the database is trained, a generated model document is called and a yolov3 algorithm framework is applied to carrying out a garbage picture detection test, and a specific test result is shown in FIG. 3. Books, plastic bottles, napkins, broken glass, iron wires, peels, plastic bags and cloth are tested respectively, and specific recognition pictures are shown in FIG. 3, in which blue frames represent the positions of the objects, and red characters in upper left corners show labels of the objects and corresponding accuracies. As can be seen, the recognition effect is good and can well meet the operating requirements of the intelligent garbage can. The abovementioned embodiments are merely several embodiments of the disclosure, and the description thereof is more specific and detailed, but is not to be construed as limiting the scope of the claims. It should be noted that several modifications and improvements can be made by those ordinarily skilled in the art without departing from the concept of this application, which fall within the scope of protection of the disclosure.

The invention claimed is:

1. An automatic classification system, comprising: a camera, an LED light, a storage battery, a solar panel, a control panel and an automatic classification garbage can; the automatic classification garbage can comprises a first steering engine (2), a second steering engine (5) and control baffles (4);

the control baffles (4) are connected with horizontal central shaft columns (3) and divides the interior of a barrel (1) into an upper box and a lower box, wherein the camera, the LED light, the storage battery, the solar panel and the control panel are all contained at an upper top of the upper box;

an output end of the solar panel is connected with the storage battery, and the storage battery supplies power for the camera, the LED light, the control panel, the first steering engine (2) and the second steering engine (5);

the control panel comprises:

a picture receiving unit connected with the camera and used for acquiring a picture acquired by the camera;

a picture processing unit for processing the picture and recognizing the classes of objects in the picture; and a steering engine control unit connected with the first steering engine (2) and the second steering engine (5), and used for driving the second steering engine (5) according to the classes of the objects recognized by the picture processing unit to drive a classification baffle (7) to rotate through a vertical central shaft column (6) to move the objects contained in the upper box onto the control baffles (4) corresponding to the classes of the objects, and then driving the first steering engine (2) to drive the control baffles (4) to turn over through the horizontal central shaft columns (3), so that the objects fall into classification boxes corresponding to the classes of the objects under the control baffles (4).

2. The automatic classification system of claim 1, wherein the first steering engine (2) and the second steering engine (5) are MG995 steering engines.

3. The automatic classification system of claim 1, wherein the automatic classification garbage can further comprises:

the barrel (1), wherein at least one garbage throwing-in opening (8) is formed in an upper part of a side wall of the barrel (1);

the first steering engine (2) is fixed to the outside the side wall of the barrel (1), and connected with horizontal central shaft columns (3), and the horizontal central shaft columns (3) penetrate through the interior of the barrel (1) in the diameter direction of the barrel (1), and are driven to rotate by the first steering engine (2);

the second steering engine (5) is arranged at an upper top of the upper box, and connected with a vertical central shaft column (6), and the vertical central shaft column (6) penetrates through the interior of the upper box in the axial direction of the barrel (1), and is driven to rotate by the second steering engine (5); and the control baffles (4) can turn over around the horizontal central shaft columns (3) with the rotation of the horizontal central shaft columns (3) to open or close a bottom of the upper box, so that the objects contained in the upper box fall into the lower box.

4. The automatic classification system of claim 3, wherein the automatic classification garbage can further comprises:

a classification baffle (7), wherein a middle part of the classification baffle (7) is connected with a lower end of the vertical central shaft column (6) to divide the upper box into two parts; and the classification baffle (7) can rotate around the vertical central shaft column (6) with the rotation of the vertical central shaft column (6) to drive the objects contained in the upper box to move onto the control baffles (4) corresponding to the classes of the objects.

5. The automatic classification system of claim 3, wherein the lower box is divided into a plurality of classification boxes by taking the horizontal central shaft columns (3) as a boundary, each control baffle (4) corresponds to one classification box, and an upper part of each classification box is closed by one control baffle (4); and the control panel acquires the picture collected by the camera, recognizes the classes of the objects in the picture, drives the second steering engine (5) according to the classes of the objects to drive the classification baffle (7) through the vertical central shaft column (6) to move the objects contained in the upper box onto the control baffles (4) corresponding to the classes of the objects, and then drives the first steering engine (2) to drive the control baffles (4) to turn over through the horizontal central shaft columns (3), so that the objects fall into classification boxes corresponding to the classes of the objects under the control baffles (4).

6. The automatic classification system of claim 3, wherein the automatic classification garbage can further comprises a first gear (21) and a second gear (22);

the first steering engine (2) is fixedly connected with the first gear (21), and the first gear (21) is engaged with the second gear (22) to transfer driving force output by the first steering engine (2) to the second gear (22);

the number of the horizontal central shaft columns (3) is two, and each horizontal central shaft column (3) is connected with one control baffle (4); and the two horizontal central shaft columns (3) are correspondingly connected with the first gear (21) and the second gear (22), and driven by the first gear (21) and the second gear (22) to drive the control baffles (4) connected with the horizontal central shaft columns (3) to turn over to open or close the bottom of the upper box, so that the objects contained in the upper box fall into the classification boxes corresponding to the classes of the objects in the lower box.

\* \* \* \* \*